US009851497B2

(12) United States Patent
Sadasivan et al.

(10) Patent No.: US 9,851,497 B2
(45) Date of Patent: Dec. 26, 2017

(54) LIGHT MIXING CHAMBER FOR USE WITH COLOR CONVERTING MATERIAL AND LIGHT GUIDE PLATE AND ASSEMBLY

(71) Applicant: SAMSUNG ELECTRONICS CO., LTD., Suwoni-si (KR)

(72) Inventors: Sridhar Sadasivan, Concord, MA (US); Karen Twietmeyer, Belmont, MA (US); Warren P. Pumyea, Gardner, MA (US); Victoria K. Hinchey, Winchester, MA (US)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 253 days.

(21) Appl. No.: 14/737,369

(22) Filed: Jun. 11, 2015

(65) Prior Publication Data

US 2015/0362654 A1    Dec. 17, 2015

Related U.S. Application Data

(60) Provisional application No. 62/010,602, filed on Jun. 11, 2014.

(51) Int. Cl.
| F21V 7/04 | (2006.01) |
| F21V 8/00 | (2006.01) |
| B82Y 20/00 | (2011.01) |

(52) U.S. Cl.
CPC .......... *G02B 6/009* (2013.01); *G02B 6/0023* (2013.01); *B82Y 20/00* (2013.01); *Y10S 977/774* (2013.01)

(58) Field of Classification Search
CPC ...... G02B 6/009; G02B 6/0023; B82Y 20/00; Y10S 977/774
USPC ..... 362/609, 608, 612, 613, 97.1, 97.2, 97.3
See application file for complete search history.

(56) References Cited

U.S. PATENT DOCUMENTS

| 2002/0191128 A1* | 12/2002 | Okumura .......... G02F 1/133526 349/96 |
| 2006/0245208 A1* | 11/2006 | Sakamoto ......... G02F 1/133603 362/612 |
| 2008/0315228 A1* | 12/2008 | Krames .................... H01L 33/46 257/98 |
| 2011/0199786 A1* | 8/2011 | Uchida ................ G02B 6/0026 362/609 |
| 2012/0113672 A1* | 5/2012 | Dubrow ................. B82Y 20/00 362/602 |
| 2013/0033678 A1* | 2/2013 | Natsumeda ............ G02B 6/005 353/20 |
| 2013/0154250 A1* | 6/2013 | Dunn ..................... G02B 5/128 283/67 |
| 2015/0009686 A1* | 1/2015 | Pumyea ................ G02B 6/003 362/341 |

(Continued)

*Primary Examiner* — Elmito Breval
*Assistant Examiner* — Glenn Zimmerman
(74) *Attorney, Agent, or Firm* — Cantor Colburn LLP

(57) ABSTRACT

A light mixing chamber of a backlight includes a housing having a channel and a chamber exposed to the channel, an LED positioned within the chamber, and a capillary containing quantum dots positioned in the channel. A light guide plate is positioned adjacent the housing and adjacent the capillary. Relative dimensions of the elements of the light mixing chamber, as well as features added to the elements of the light mixing chamber, can be varied to balance efficiency and uniformity of light generated in the backlight.

17 Claims, 11 Drawing Sheets

(56) References Cited

U.S. PATENT DOCUMENTS

2015/0214445 A1* 7/2015 Qiu ..................... H01L 27/15
  257/88
2015/0226904 A1* 8/2015 Bae ..................... G02B 6/0086
  362/608

* cited by examiner

180
LIGHT MIXING CHAMBER FOR USE WITH COLOR CONVERTING MATERIAL AND LIGHT GUIDE PLATE AND ASSEMBLY

This application claims priority to U.S. Provisional Patent Application No. 62/010,602, filed 11 Jun. 2014, which is hereby incorporated herein by reference in its entirety for all purposes.

TECHNICAL FIELD OF THE INVENTION

Aspects of this invention relate generally to a light mixing chamber and, in particular, to a light mixing chamber for use with a LED, a capillary filled with color converting material housed within the chamber, and a light guide plate of a backlight.

BACKGROUND OF THE INVENTION

Backlights are used for illumination in liquid crystal displays (LCDs) and may use light emitting diodes (LEDs) as the light source. The light from an LED is injected into a light guide plate which distributes the light evenly in the backplane of the backlight. Standard backlights utilize a white LED in the light generating portion of the backlight. The white LED is typically an assembly including a light emitting semiconductor die emitting at higher frequency (e.g., ultraviolet or blue) together with a color converting material which converts some portion of the higher frequency light to lower frequency visible light (e.g., green and red). The combination of higher frequency and lower frequency light generates white light. The color converting material is typically a phosphor or combination of phosphors with a broad spectral bandwidth.

SUMMARY OF THE INVENTION

In the invention described herein, the light generating portion of the backlight utilizes one or more discrete LEDs emitting at higher frequencies (e.g., ultraviolet or blue) that excite a remotely located color converting material containing color converting elements, such as quantum dots (semiconductor nanocrystals), which convert some portion of the higher frequency light to lower frequency visible light (e.g., green and red). The combination of the higher frequency light passing through and/or around the outside of the color converting material and the shorter frequency light emitted by the color converting material gives white light. The narrow spectral bandwidth of the emission peaks of the quantum dots enables higher efficiency and/or wider color gamut backlights as compared with the standard white LED solution. One way to introduce quantum dots (QDs) or other color converting elements into a backlight unit (BLU) is to place them along one or more edges of the BLU, between the higher frequency LED illumination and the light guide plate face. However, light that passes from the LED through the color converting material to the light guide plate is multiply scattered and reflected, leading to a loss of efficiency and distortion of the backlight color uniformity. An appropriate optical system between the LED and the light guide plate face can be designed to improve efficiency and color uniformity or provide a desired balance between efficiency and color uniformity.

The principles of the invention may be used to provide a light mixing chamber for use with a light guide plate in a backlight using LEDs and a capillary containing a color converting material. To achieve high efficiency and good color uniformity at the display color gamut and white point of choice, an appropriate optical system is required to optimally inject a combination of the higher frequency light from the LED and the lower frequency light emitted by the color converting material into the edge of the light guide plate.

In accordance with a first aspect, an assembly includes a housing having a channel exposed to an exterior of the housing, a chamber, and an aperture connecting the chamber to the channel. The channel includes a base portion, a first wall, and an opposed second wall. An LED is positioned within the chamber, and a capillary is positioned in the channel and has an interior cavity containing a matrix formulation which contains a color converting material and scattering elements. At least one flange extends inwardly into the channel at an end of one of the first wall and the second wall, and covers part of an emitting face of the capillary. A light guide plate is positioned adjacent the housing and adjacent the capillary.

In accordance with another aspect, the capillary may have a major outer diameter that is one of less than or equal to a height of the light guide plate, and greater than or equal to the height of the light guide plate.

In accordance with a further aspect, a light mixing chamber includes a housing having a channel exposed to an exterior of the housing, a chamber, and an aperture connecting the chamber to the channel. An LED is positioned within the chamber, and a capillary having an interior cavity containing color converting material is positioned in the channel. A light guide plate is positioned adjacent the housing and adjacent the capillary. Scattering particles are positioned in one of an interior cavity of the capillary and within a wall of the capillary.

In accordance with other aspects, a method of balancing efficiency and color uniformity of light produced in a backlight includes the steps of providing a light mixing chamber including a housing having a channel exposed to an exterior of the housing, a chamber, and an aperture connecting the chamber to the channel, an LED positioned within the chamber, a capillary containing color converting material positioned in the channel, and a light guide plate positioned adjacent the housing and adjacent the capillary; and varying a first distance between the LED and the capillary to produce a desired balance between efficiency and color uniformity of light produced by the light mixing chamber, wherein decreasing the first distance increases efficiency and color uniformity and increasing the first distance decreases efficiency and color uniformity.

The use of a light mixing chamber with higher frequency LEDs together with a capillary containing color converting material can provide higher efficiency and/or wider color gamut backlights than are possible with standard white LED solutions. The light mixing chamber designs for the color converting material based backlight as described herein can improve efficiency and color uniformity or provide a desired balance between efficiency and color uniformity. These and additional features and advantages disclosed here will be further understood from the following detailed disclosure of certain embodiments.

It should be appreciated by those persons having ordinary skill in the art(s) to which the present invention relates that any of the features described herein in respect of any particular aspect and/or embodiment of the present invention can be combined with one or more of any of the other features of any other aspects and/or embodiments of the present invention described herein, with modifications as appropriate to ensure compatibility of the combinations.

Such combinations are considered to be part of the present invention contemplated by this disclosure.

It is to be understood that both the foregoing general description and the following detailed description are exemplary and explanatory only and are not restrictive of the invention as claimed.

Figure 1:
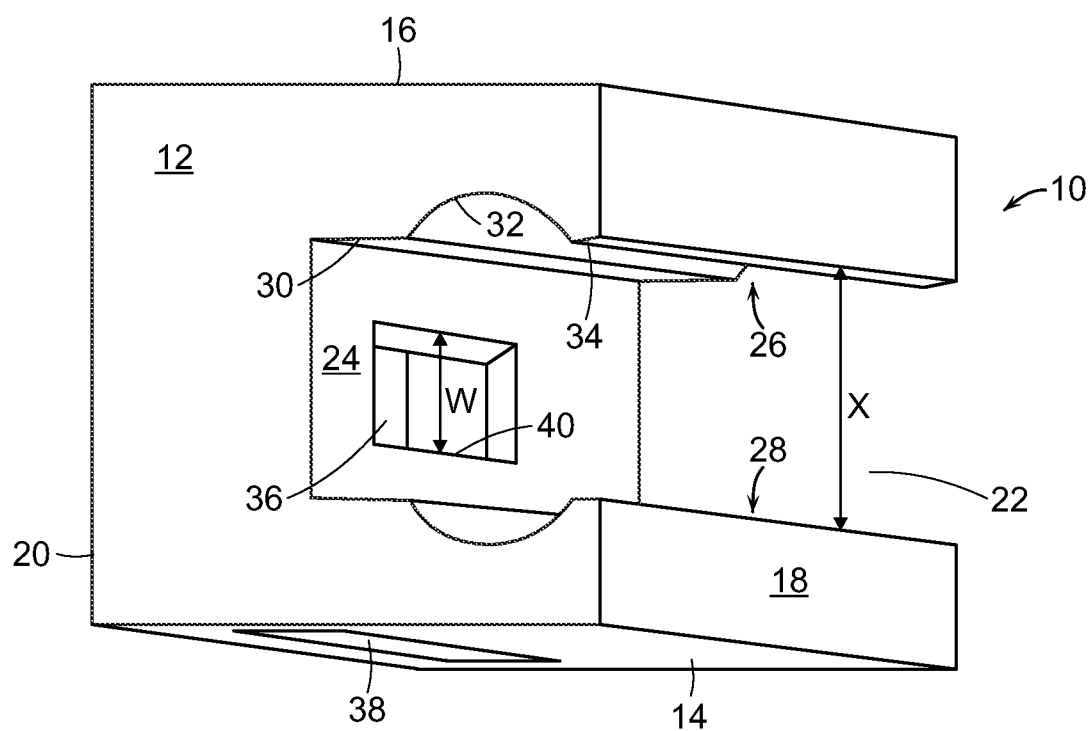
FIG. 1 is a perspective view of a light mixing chamber for use with a light guide plate and a capillary in a backlight.

The figures referred to above are not drawn necessarily to scale, should be understood to provide a representation of particular embodiments of the invention, and are merely conceptual in nature and illustrative of the principles involved. Some features of the light mixing chamber depicted in the drawings have been enlarged or distorted relative to others to facilitate explanation and understanding. The same reference numbers are used in the drawings for similar or identical components and features shown in various alternative embodiments. Light mixing chambers as disclosed herein would have configurations and components determined, in part, by the intended application and environment in which they are used.

DETAILED DESCRIPTION OF THE INVENTION

The following discussion and accompanying figures disclose a light mixing chamber for use with a light guide plate in an LED backlight. An individual skilled in the relevant art will appreciate, given the benefit of this specification, that the concepts disclosed herein with regard to the light mixing chamber may apply to a wide variety of light applications, in addition to the specific embodiments discussed in the following material and depicted in the accompanying figures.

A light mixing chamber 10 for use with a light guide plate in a backlight is depicted in FIG. 1 as including a housing 12 having a first side or surface 14 and an opposed second side or surface 16. In the illustrated embodiment, first surface 14 and second surface 16 are substantially planar surfaces and extend substantially parallel to one another. Both a third side or surface 18 and an opposed fourth side or surface 20 extend between first and second surfaces 14, 16. In the illustrated embodiment, third surface 18 and fourth surface 20 are substantially planar surfaces, extend substantially parallel to one another, and extend substantially perpendicular to first surface 14 and second surface 16.

A channel 22 is formed in third surface 18. In the illustrated embodiment, channel 22 is substantially U-shaped and includes a base portion 24, a first wall 26 and an opposed second wall 28. Base portion 24 may extend substantially parallel to third surface 18 and fourth surface 20, and substantially perpendicular to first surface 14 and second surface 16. First wall 26 and second wall 28 may include a first portion 30, a second portion 32, and a third portion 34.

In the illustrated embodiment, each first portion 30 is a wall segment extending outwardly from base portion 24 to second portion 32. In the illustrated embodiment, each first portion 30 extends substantially perpendicular to base portion 24. Each second portion 32 is a curved groove formed in housing 12. Second portion 32 may have a radius R of between approximately 0.2 mm and approximately 3.0 mm. Each third portion 34 is a wall segment extending outwardly from an outermost end of second portion 32 to third surface 18. In the illustrated embodiment, each third portion 34 extends substantially perpendicular to third surface 18.

A chamber 36 is formed in housing 12. In the illustrated embodiment, chamber 36 is in communication with an exterior of housing 12 by way of a recess 38 formed in first surface 14. It is to be appreciated that recess 38 could be formed in other surfaces of housing 12, such as fourth surface 20, for example. An aperture 40 is formed in base portion 24 of housing 12, and extends between and connects chamber 36 to channel 22. Aperture 40 has a width W that is narrower than a width X of channel 22.

In the illustrated embodiment, aperture 40 is rectangular in shape, but it is to be appreciated that aperture 40 can have any desired shape. For example, the internal corners of aperture 40 may be curved with any desired radius. Other suitable shapes for apertures 40 will become readily apparent to those skilled in the art, given the benefit of this disclosure. The size of aperture 40 is selected to accommodate LEDs of various sizes. In certain embodiments, the size is tailored for the particular LEDs to be used. The size of aperture 40 can also be selected to minimize the blockage of light emitted by the LED and/or to minimize the amount of back-reflected light able to exit the chamber through aperture 40. It is to be appreciated that in certain embodiments the LED may be inserted into base portion 24 though fourth side 20.

Figure 2:
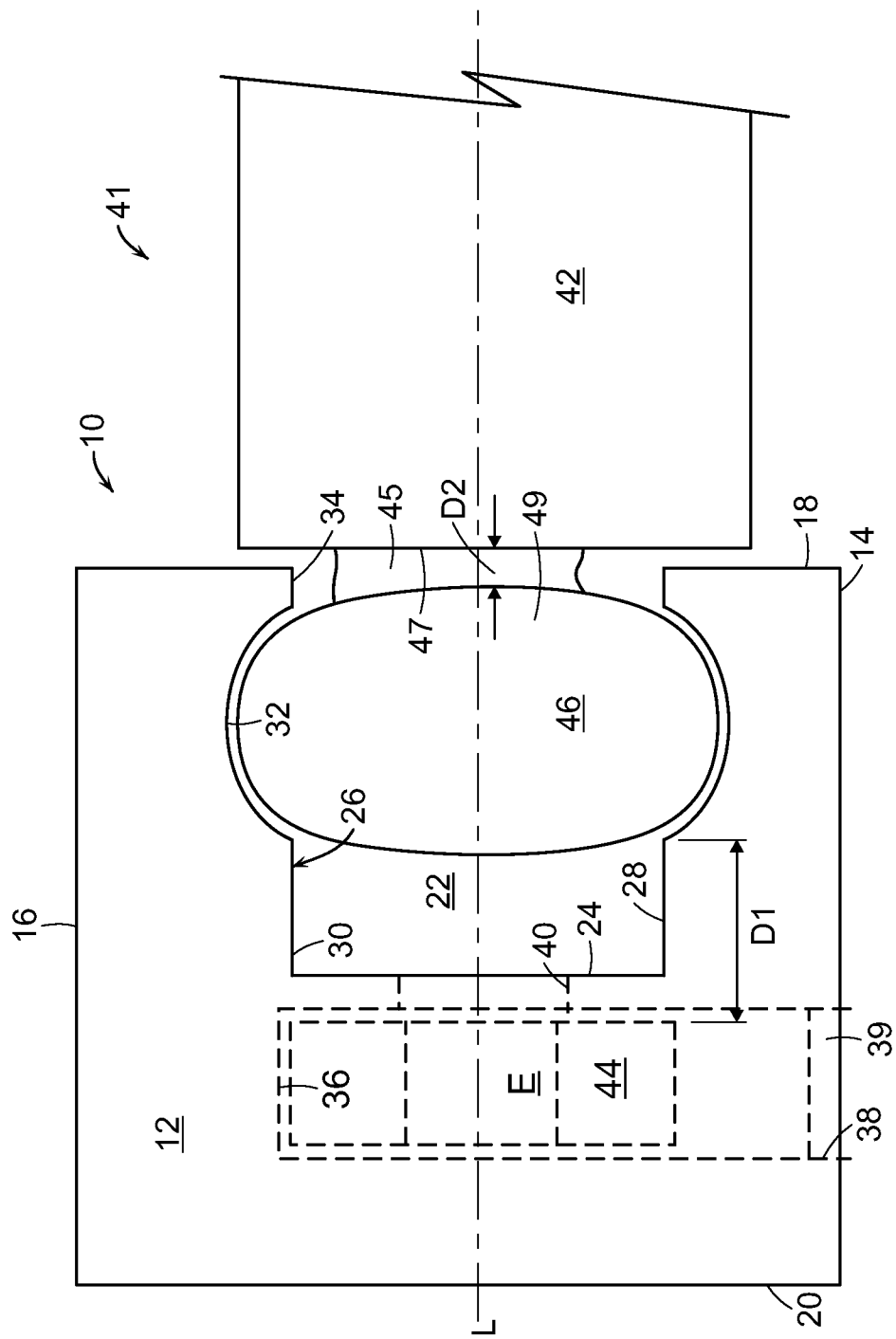
FIG. 2 is an elevation view of the light mixing chamber of FIG. 1, shown in use with an LED, a capillary, and a light guide plate.

Light mixing chamber 10 is seen in FIG. 2 in use with a light guide plate 42 of a backlight. An LED 44 is inserted through recess 38 and is seated in chamber 36. It is to be appreciated that in certain embodiments, recess 38 may include a cover 39 so that chamber 36 is sealed from the exterior of housing 12. Cover 39 may be contained within recess 38, positioned on first surface 13 on the exterior of housing 12, or it may be a portion of another element outside of housing 12.

It is to be appreciated that light mixing chamber 10 can be used with a variety of LEDs including, but not limited to, surface mount, dome type, flat top side emitting diodes, and top face emitters. LEDs included in a backlight unit can be selected to emit light with a predetermined peak emission wavelength. For example, LEDs included in a backlight unit can be selected to emit light with a wavelength in the visible or ultraviolet regions of the electromagnetic spectrum. LEDs that emit polychromatic light can also be included. If more than one LED is included, each LED can be selected to emit light with a peak emission that is the same as that of the other LEDs. Alternatively, if more than one LED is included, the LEDs can be selected so that one or more of the LEDs emit light with a peak emission at a wavelength that is different from that emitted by at least one of the other LEDS. In certain embodiments, for example, all of the LEDs can be selected to emit light with a peak emission in the blue region of the visible spectrum or in the ultraviolet region of the spectrum.

Figure 3:
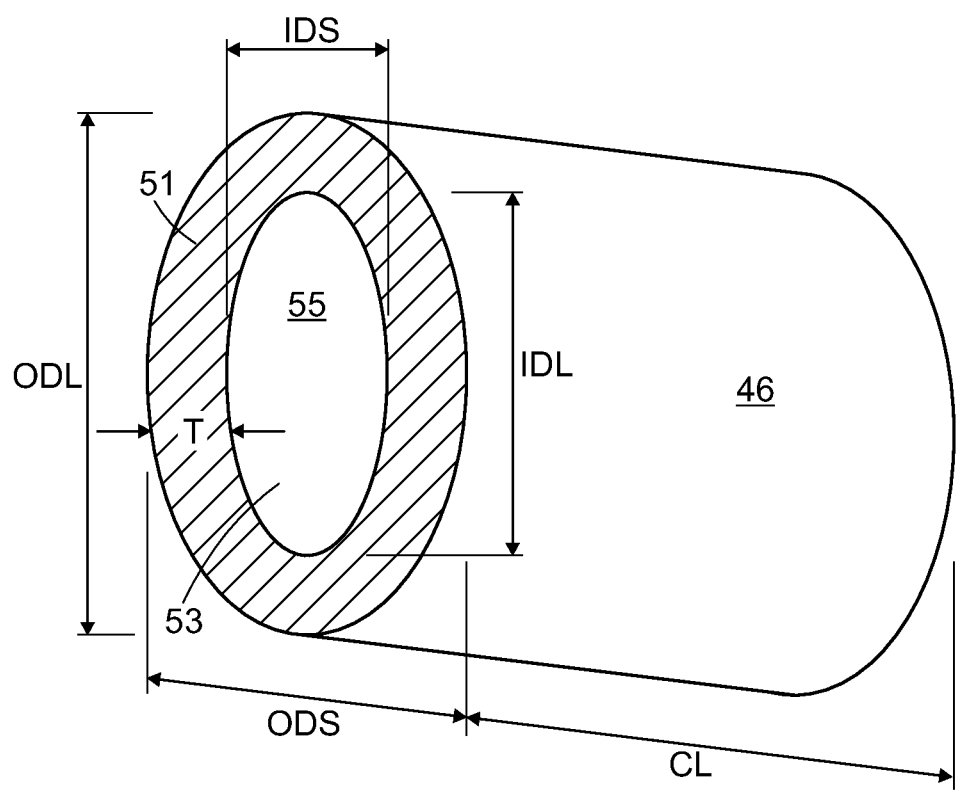
FIG. 3 is a perspective view of the capillary of FIG. 2, shown partially in section.

An optical member or capillary 46, as seen in FIGS. 2 and 3, is positioned between and captured by second portions 32 of first wall 26 and second wall 28. Capillary 46 may be a glass or other optically clear solid material member filled with color converting material and sealed with end walls 49 at its opposed ends. An optically clear solid material has low optical absorption over the spectral range of interest (i.e. the visible) to maximize efficiency. In certain embodiments, the optical absorption may be less than 0.1% per mm.

In certain embodiments, it is desirable for capillary 46 to have very low permeability to oxygen to extend the lifetime of the QDs. In certain embodiments, the permeability is less than approximately 0.01 cc per square meter per day.

The color converting material may be, for example, quantum dots, phosphors, or fluorescent material. Other suitable color converting materials will become readily apparent to those skilled in the art, given the benefit of this disclosure.

By fashioning second portions 32 as curved grooves, an optical member or capillary 46 having curved surfaces on opposed sides thereof can be secured in a robust manner within housing 12. It is to be appreciated that second portions 32 can have other geometries to mate with the geometry of optical members 46 having surfaces with shapes different than the curved surfaces seen in this exemplary embodiment.

Housing 12 operates to maintain capillary 46 at a desired location with respect to LED 44 and light guide plate 42, and to redirect light that would otherwise not be injected into light guide plate 42 into a more efficient direction. Housing 12 may also serve to direct more higher frequency light from the LED into capillary 46 to improve backlight efficiency.

Housing 12 may also dissipate heat produced by LED 44 and optical member 46. Housing 12 may be electrically insulating, high in diffuse or specular bulk reflectivity (typically greater than 95% across the visible range), thermally conductive, and may be formed of a material able to withstand temperatures of up to 105° C. and fluxes of up to 1 W/cm$^2$ without any significant degradation of reflective properties across visible wavelengths or mechanical and structural integrity. If uncoated, housing 12 must have sufficient thickness to maintain bulk reflectivity, and may have any machined, printed, or molded surface finish that maintains a high reflectivity. Housing 12 may be coated with a white reflective paint or other coating such as Star-Brite White EF (available from SPRAYLAT Sign Coatings) or a barium sulfate based white paint, thermal sprays that include ceramic(s), polymer sprays that include Teflon PTFE, or specularly reflective coatings such as Aluminum or Silver.

Housing 12 may be formed of metal, such as aluminum, tin, zinc, magnesium, or an alloy including at least one of the foregoing. Housing 12 can also be formed of other materials such as Makrolon® by Bayer, Lexan® by GE, OP.DI.MA. by Gigahertz-Optik, polyethylene terephthalate (PET), micro cell polyethylene terephthalate (MCPET), GORE® Diffuse Reflector Product, Idemitsu URC2501, and Delrin® and Teflon by Dupont, for example. Other suitable materials for housing 12 will become readily apparent to those skilled in the art, given the benefit of this disclosure.

Housing 12 may be formed by machining, stamping, extrusion, molding, 3D printing, or casting, for example. Other suitable ways of forming housing 12 will become readily apparent to those skilled in the art, given the benefit of this disclosure.

In certain embodiments, chamber 36, aperture 40 and channel 22 of housing 12 are configured such that distance D1 between LED 44 and optical member 46 is between approximately 0.3 mm and approximately 1.0 mm, and distance D2 between LED 44 and side edge 47 of light guide plate 42 is less than or equal to approximately 0.6 mm. In other embodiments, distance D2 can be larger to accommodate thermal expansion of light guide plate 42, and can be as large as approximately 2 mm. The distances D1 and D2 can be varied in order to improve the performance of the light mixing chamber 10 in use with the components housed therein as well as to facilitate manufacturability. For example, distance D1 controls both the amount of higher frequency light incident on the housing material where it may be absorbed and the amount of higher frequency light that passes into the wall of the capillary. The higher frequency light that passes into the wall without interacting with the color converting material is emitted from the capillary with spatial location and angular distribution that are significantly different from those of the higher frequency light that passes through the color converting material and the lower frequency light emitted from the color converting material, resulting in worse color uniformity. A smaller value for distance D1 may be used to reduce both absorption and the amount of light passing through the walls. Distance D1 also controls the optical flux incident on the color converting material. A larger value for distance D1 may be required to ensure that the optical flux on the color converting material does not exceed a maximum value which is dependent on the formulation of the color converting material and its expected lifetime. The optical flux per area incident on the surface of matrix 55 (which is contained within capillary 46 and discussed in greater detail below with respect to FIG. 3) that is facing LED 44 and that is at a distance D1 from the face of LED 44 is termed the optical irradiance on that surface. The optical irradiance decreases as distance D1 increases. The rate of decrease is significantly lower in the near field, where the size of the source and the distance from source to surface are similar, as compared to the far field, where the size of the source is significantly smaller than the distance to the surface. As this invention operates in the near field where the rate of irradiance decrease with distance D1 is low, the irradiance on the surface of matrix 55 may be sensitively adjusted through the choice of distance D1. Thus, distance D1 is a lever that can be used to balance efficiency, color uniformity, and color converting material lifetime.

Distance D2 controls the amount of light emitted by the capillary that is then injected into the light guide plate. A smaller value for distance D2 results in increased injection of both the desirable white light emitted from the color converting material and the higher frequency light that passes through the walls, and thus distance D2 is a lever that can be used to balance efficiency and color uniformity. Further, the configuration of housing 12 and distances D1 and D2 in particular are chosen to accommodate the expansion and contraction of the components housed within housing 12, which may have different Coefficients of Thermal Expansion (CTE's).

It is to be appreciated that in certain embodiments, a layer of index matching adhesive, fluid or gel 45 may be positioned between capillary 46 and side edge 47 of light guide plate 42, or between capillary 46 and LED 44, to improve the optical efficiency by reducing Fresnel reflections. Gel 45 may be formed for example of appropriate polymers, or silicones. Other suitable materials for gel 45 will become readily apparent to those skilled in the art, given the benefit of this disclosure.

Light projected from LED 44 passes through aperture 40, through capillary 46, and into light guide plate 42. It is to be appreciated that light mixing chamber 10 can be implemented with light guide plate 42 in any backlight configuration including, for example, 2V, 2H, 1V, and 1H.

Additionally, chamber 36, aperture 40 and channel 22 of housing 12 are ideally configured such that a center line L of each of light guide plate 42 and optical member 46 are coaxial with the center of emission area E of LED 44. However, if requirements such as manufacturability and bezel size dictate otherwise, small departures may be made from co-linearity with associated reductions in efficiency and color uniformity.

As illustrated in FIG. 3, capillary 46 may have any cross-sectional profile that encloses a sufficient volume of color converting material to provide the required amount of conversion to lower frequency light as well as fitting within the boundaries of the housing. For example, the shape may be circular, elliptical, racetrack-shaped (as illustrated herein), square, rectangular, or dogbone-shaped. In all cases there is a wall 51 having a thickness T and defining an interior cavity 53. Capillary 46 has an extruded length CL, a long outer diameter ODL parallel to its major axis, and a short outer diameter ODS parallel to its minor axis, and perpendicular to ODL. Similarly, capillary 46 has a long inner diameter IDL parallel to its major axis, and a short inner diameter IDS parallel to its minor axis, and perpendicular to IDL.

In certain embodiments, ODL is ≤the height of light guide plate 42, which increases efficiency. In other embodiments, ODL is ≥the height of light guide plate 42, which improves color uniformity. Varying the ratio of ODL/light guide plate height 42 therefore acts as a lever to balance efficiency and color uniformity.

Cavity 53 of capillary 46 may be filled with a matrix 55 containing a color converting material. The higher frequency light emitted from the LED may have a narrower angular distribution than the lower frequency light emitted from the color converting material. The difference in angular distribution between lower frequency and higher frequency light may increase BLU color nonuniformity. To better match the angular profiles between higher and lower frequency light, and achieve a more uniform angular emission pattern light, light scattering particles, or scatterers 69, may be added to the matrix to achieve a more uniform angular emission pattern (as discussed and illustrated below with respect to FIG. 10). The scatterers are sub-wavelength size particles with refractive index significantly higher than that of the matrix and are often composed of titanium dioxide, zinc oxide, antimony oxide, or mixtures thereof. If scatterers are present in the matrix, a shorter path length (i.e. smaller IDS) results in less scattering. As the light then proceeds more in the forward direction and has less interaction with peripheral absorbing structures such as the LEDs and mixing chamber 10, there is less absorption. Therefore, IDS affects efficiency (smaller IDS=less absorption=higher efficiency) and color uniformity (smaller IDS=less scattering=decreased uniformity). The value of IDS together with the scatterer concentration is thus a lever to balance the tradeoff between efficiency and color uniformity.

An appropriate scatterer will have a high enough index of refraction relative to the matrix index of refraction to provide sufficient scattering, and may be greater than 2.0; will have an appropriate size distribution to produce a sufficiently wide angle scattering distribution, and may have a diameter on the order of ½ the wavelength of light, e.g., between approximately 200 nm and approximately 400 nm; and will have low absorption for the wavelength range of interest (i.e., the visible), and may have a value similar to glass, i.e. less than approximately 0.1% per mm.

The color of light injected into the light guide plate may be expressed as a color point, which is a two element color coordinate in a relevant color space such as the CIE 1931 xy chromaticity space or the CIE 1976 u'v' chromaticity space. The concentration of color converting elements required in matrix 55 to produce a desired color point increases as the internal cross sectional area of capillary 46 decreases. For example, when the color converting material contains QDs, as there is an upper limit on the achievable QD concentration due to solubility limits of the QDs in matrix 55, there will be a lower limit to the internal cross sectional area to achieve a given color point. In certain embodiments, the upper limit on achievable QD concentration is approximately 5% by weight of the total weight of matrix 55.

The optical coupling efficiency between the capillary and the light guide plate is determined by the relative etendues, or products of emission area and emission solid angle. For a color converting material with a wide emission angle, such as a phosphor or QD, for highest efficiency ODL should be as small as practical relative to the light guide plate entrance face height while maintaining the matrix volume needed to provide sufficient low frequency conversion. However, as a smaller ODL will increase the amount of higher frequency light passing through the capillary walls that is injected into the light guide plate, the color uniformity will be worse. Thus ODL is a lever to balance efficiency and color uniformity.

Figure 4:
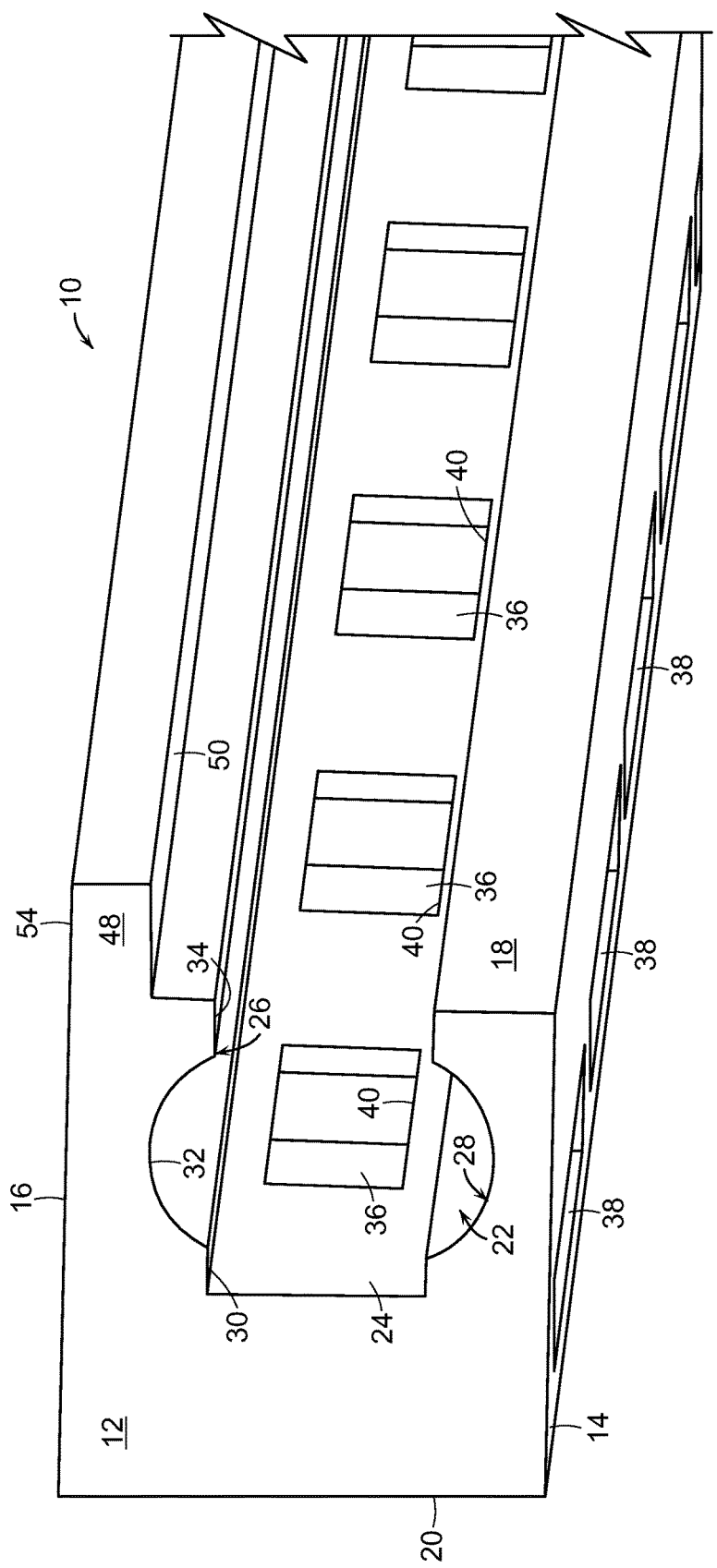
FIG. 4 is a perspective view of an alternative embodiment of the light mixing chamber of FIG. 1, which includes a plurality of chambers for housing a plurality of LEDs.

In certain embodiments, as illustrated in FIG. 4, light mixing chamber 10 includes a plurality of chambers 36 and mating recesses 38 and apertures 40, allowing a plurality of LEDs 44 to be seated in the chambers 36. Accordingly, light guide plate 42 and capillary 46 extend along the length of light mixing chamber 10 in order to receive the light transmitted from the plurality of LEDs 44. In certain embodiments, a wall segment, shoulder, or rib 48 extends outwardly from third surface 18 proximate to second surface 16. An inner surface 50 of rib 48 extends along a portion of a projection surface of a light guide plate, where the projection surface of the light guide plate is the surface of light guide plate that faces a user. Rib 48 serves to redirect higher frequency light that has passed through the capillary walls, with the goal to reduce hotspots within the light guide plate, thereby improving the color uniformity of the backlight. In the illustrated embodiment, an outer surface 54 of rib 48 opposite inner surface 50 is flush with second surface 16. However, it is to be appreciated that outer surface 54 need not be flush with second surface 16 in other embodiments, and could extend beyond second surface 16 or be set back from second surface 16.

Figure 5:
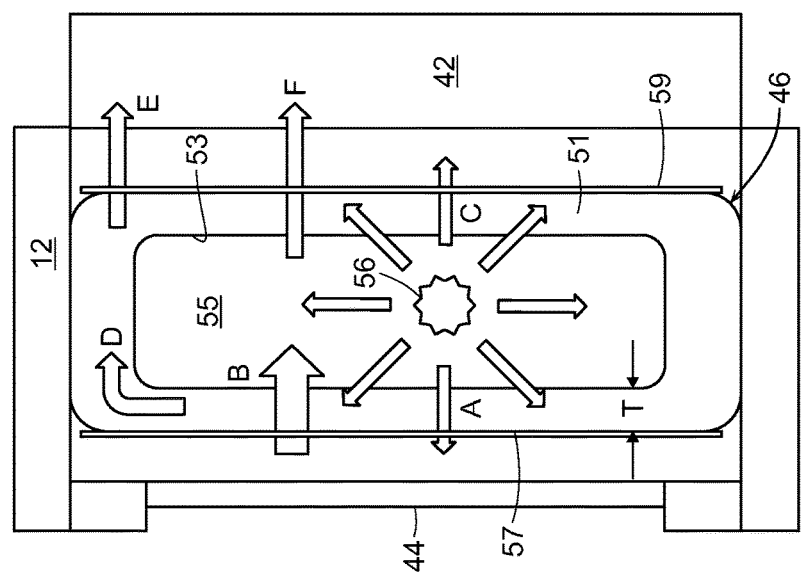
FIG. 5 is a schematic elevation view of the light mixing chamber of, LED, capillary, and light guide plate of FIG. 2, illustrating the transmission and reflectivity of light throughout the assembly.

As schematically illustrated in FIG. 5, matrix 55 may be filled with a color converting material 56. Capillary wall 51 and matrix 55 combine to form a mixing cavity, with the wall-air interfaces forming reflectors. Higher frequency light that enters cavity 53 reflects multiple times between the reflectors, with each pass through cavity 53 generating additional lower frequency light as the higher frequency light is absorbed by the color converting material. Some percentage of the light within cavity 53 passes through the reflectors, with the percentage depending on their spectral reflectivity. Forward passed light is emitted towards light guide plate 42, and backward passed light is emitted towards LED 44, where some portion may be absorbed. For optimal forward emission efficiency, the spectral reflectivity of the reflectors may be chosen to give the optimal balance between the amount of higher frequency light entering cavity 53 to generate conversion, the amount of light of all frequencies exiting cavity 53 in the desirable forward direction, and the amount of light of all frequencies exiting cavity 53 in the undesirable backward direction.

In certain embodiments, customized coatings may be applied to capillary 46 in order to tune the spectral transmission and reflectivity of each wall-air interface and thus alter the properties of mixing chamber 10 and by extension improve the efficiency. These coatings may have uniform transmission and reflectivity characteristics across the wavelength band of interest (e.g., the visible), such as an anti-reflective coating, or may have transmission and reflectivity characteristics which vary with wavelength, such as a dichroic coating. For example, a first dichroic coating 57 with partial reflectivity for higher frequency light and high reflectivity for lower frequency light may be applied to the LED-facing surface of capillary 46. This will improve efficiency by minimizing the backward-directed light exiting capillary 46, as shown by arrow A, that is absorbed by the LED package and other mechanical structures, while allowing enough higher frequency light to enter the chamber, as illustrated by arrow B, such that there is sufficient conversion. For example, the first dichroic coating may have a transmission for higher frequency light that is 50% or higher, and a reflectivity for lower frequency light that is as high as possible, typically greater than 95%. The light guide plate-facing side of capillary 46 may have a second dichroic coating 59 with partial reflectivity for higher frequency light that will keep a sufficient portion in matrix 55, while providing a low reflectivity for lower frequency light so that it is emitted in the forward direction with high efficiency, as indicated by arrow C. For example, the second dichroic coating may have a transmission for higher frequency light that is 50% or higher, and a transmission for lower frequency light that is as high as possible, typically greater than 95%.

The coatings may be formed of layers including combinations of metal oxides, fluorides, and/or other appropriate dielectric materials. Other suitable coatings will become readily apparent to those skilled in the art, given the benefit of this disclosure. In general, either side or both sides of capillary 46 may be coated, and the spectral transmission and reflectivity profiles of the front side and back side coatings may be individually adjusted to provide the highest efficiency for a given system. It is to be appreciated that such a coating could also be applied to the interior sides of wall 51 within interior cavity 53. Coatings may be applied to a capillary using various techniques, such as thermal evaporation, sputtering, chemical vapor deposition, and dip coating; with the latter being most appropriate for mass production.

Higher frequency light takes multiple paths through capillary 46. Some portion of the higher frequency light emitted from LED 44 enters wall 51 of capillary 46 and passes straight through or is waveguided via total internal reflection, as illustrated by arrow D, through wall 51 without entering matrix 55 within interior cavity 53. The thickness T of wall 51 controls the proportion of higher frequency light that passes through the walls, with a smaller wall thickness resulting in less light passing through the walls. The portion of light that passes through the capillary walls progresses in the forward direction which results in narrow angular higher frequency emission at the top and bottom of capillary 46, as illustrated by arrow E (showing the emission at the top of capillary 46). The portion of light that does not pass through the walls, shown as arrow B, progresses in the forward direction via scattering through matrix 55 within cavity 53, which results in substantial angular broadening and mixing of higher frequency light with lower frequency emitted light exiting capillary 46 as shown by arrow F. Thus, wall thickness T can be used as a lever to balance the efficiency, spatial color uniformity and angular color uniformity of the emitted light. In addition, as the color converting element concentration needed to obtain a target color point increases as wall thickness increases, wall thickness T can be used as a lever to reduce the required color converting element concentration for reduced product cost.

Figure 6:
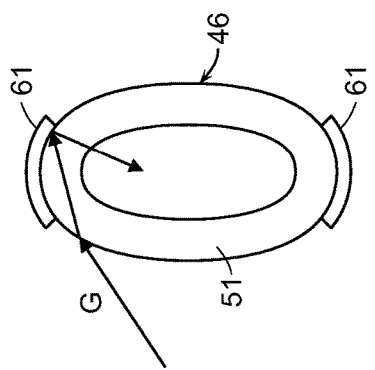
FIG. 6 is an elevation view of an alternative embodiment of the capillary of FIG. 2, shown with a surface treatment.

It is to be appreciated that the higher frequency light passing through wall 51 of capillary 46 due in part to total internal reflection is a significant source of color non-uniformity. In certain embodiments, as illustrated in FIG. 6, one or more treated portions 61 of an exterior of wall 51 of capillary 46 may be created by roughening capillary wall 51, or by applying a diffusive high reflectivity paint to capillary wall 51. In the illustrated embodiment, upper and lower portions of the exterior of wall 51 include treated portions 61. With such treated portions 61, the total internal reflection condition is removed and the light striking this portion of wall 51 is diffusely reflected rather than specularly reflected, as illustrated by arrows G.

Some portion of the diffusely reflected light enters the matrix where it is scattered and/or converted by color converting material 56, leading to improved color uniformity. As with decreased wall thickness, surface treatment of the upper and lower portions of capillary wall 51 also enables the use of lower color converting element concentrations. Surface roughening may also be applied to one or both of the side portions of wall 51, rather than or in addition to the upper and lower portions illustrated here, in order to increase scattering of the higher frequency light and thus increase its angular distribution profile, and better match the angular emission profile of the color converting element, which may have wider angular distribution profile, for better color uniformity. With all such surface treatments, there is a tradeoff between improved color uniformity and lower efficiency due to the scattering process.

Figure 7:
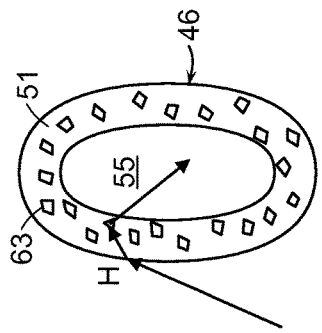
FIG. 7 is an elevation view of another alternative embodiment of the capillary of FIG. 2, shown with scattering particles positioned within the wall of the capillary.

In certain embodiments, as illustrated in FIG. 7, scattering particles or scatterers 63 can be positioned within capillary wall 51. With scatterers 63 within wall 51, the light that would otherwise pass through the wall is diffusely reflected, as illustrated by arrows H. Some portion of the diffusely reflected light enters the matrix where it is scattered and/or converted by the color conversion elements in matrix 55. As with surface treatments, scatterers inside capillary wall 51 provides better color uniformity and also enables the use of lower color converting element concentrations. It is to be appreciated that there is a tradeoff between improved color uniformity and lower efficiency due to the scattering process. Scatterers 63 may be formed of sub-wavelength size particles with significantly higher index of refraction than that of the matrix material, such as titanium dioxide, zinc oxide, antimony oxide, or suitable combinations. Other suitable materials for scatterers 63 will become readily apparent to those skilled in the art, given the benefit of this disclosure.

Figure 8:
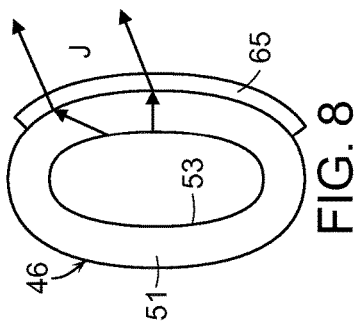
FIG. 8 is an elevation view of a further alternative embodiment of the capillary of FIG. 2, shown with a microlens coating on an exterior of the wall of the capillary.

In certain embodiments, as illustrated in FIG. 8, a micro-patterned or microlens coating or film formed of an optically clear material, usually polymeric, containing protrusions which may be irregularly shaped or lens shaped that redirect the light 65 may be positioned on an exterior of capillary wall 51. As illustrated here, microlens coating or film 65 is applied to the light-exiting side of wall 51. However, it is to be appreciated that microlens coating or film 65 may be applied to either or both exterior sides of capillary wall 51, or to the interior of wall 51 within cavity 53. The microlens coating or film may provide improvements in efficiency and color uniformity of light transmission by re-distributing incident light into a different angular distribution. For example, the angular distribution of the near on-axis light may be broadened, and/or the distribution of the far off-axis light may be narrowed, to provide better efficiency and color uniformity, as indicated by arrow J. For example, when using a microlens coating with tightly packed spherical beads having 2 micron diameter, or using a micro-patterned coating with multiple feature sizes in the range 2-20 um, the efficiency may be increased by up to 10%.

There are multiple means of applying a microlens coating to the exterior of capillary wall 51. In one embodiment, a thin (typically 50-200 micron thick) sheet or film with a micro-patterned or microlens structure may be secured to capillary wall 51 via an adhesive. The use of an index matching adhesive between microlens sheet or film 65 and wall 51 eliminates the air gap between the sheet or film and the capillary, thus eliminating Fresnel reflections. The microlens sheet or film may be fabricated for example via roll-to-roll nano-imprinting of a polymeric material, creation of a photo-resist master and/or injection molding tool for the embossing of a polymeric material, or embedding glass or plastic beads into a transparent polymeric material.

Figure 9:
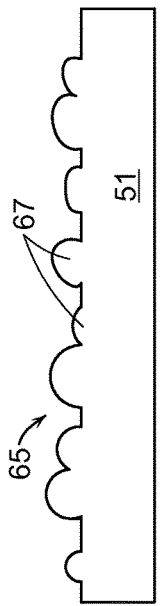
FIG. 9 is an elevation view of the wall of the capillary of FIG. 8, illustrating the microlens coating on the wall of the capillary.

In a second embodiment, as illustrated in FIG. 9, a microlens coating 65 can be formed of optically clear beads 67 (usually glass or plastic) that are embedded to some depth within a thin optically clear binding fluid that is applied directly to the capillary, for example via a spray coating or dip coating process. Beads 67 may be formed of glass or plastic, for example. The binding medium may be a UV- or thermally-curable polymer. Other suitable materials for beads 67 and the binding medium will become readily apparent to those skilled in the art, given the benefit of this disclosure.

It is to be appreciated that the performance of microlens coating or film 65 can vary depending on the microstructure of the microlens features, and that characteristics of coating 65 can be varied to balance efficiency and color uniformity for a given system. For example, the bead size may range between approximately 2 micron and approximately 50 micron; the bead density, or gap between beads, may be approximately 5 micron or less; and the bead depth in the binding medium may be approximately 50% on average, each of which can be varied.

Figure 10:
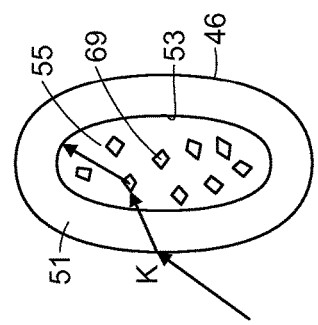
FIG. 10 is an elevation view of a yet another alternative embodiment of the capillary of FIG. 2, showing scattering particles positioned within the matrix in the interior cavity of the capillary.

As noted above, scattering particles 69 may be dispersed in matrix 55, as illustrated in FIG. 10. Light interacting with particles 69 will be scattered within a specific range of directions, as illustrated by arrows K, according to the size and index of refraction of the particles. If the scattering profile is sufficiently widely distributed in angle, the higher frequency light will derive a wider angular profile that may better match the angular emission profile of the color converting element. However, in this case, more higher frequency light will scatter away from the forward direction and interact with peripheral absorbing structures such as the LEDs and holder, and the efficiency will be lower. Thus, an appropriate scatterer may be used as a lever to balance efficiency and color uniformity.

The higher frequency light passing through capillary wall 51 partly due to total internal reflection may increase color non-uniformity. Features may be added to housing 12 between LED 44 and capillary 46 to redirect light to the matrix region that would otherwise be injected into the capillary walls. Features may be added to housing 12 between capillary 46 and light guide plate 42 to redirect higher frequency light into matrix 55 that has passed through the capillary wall and would either miss the light guide plate 42 due to an undesirable position and/or angle, or otherwise inject into light guide plate 42 at an undesirable position and/or angle. In both cases, efficiency is lower due to absorption of light via interaction with the added housing features, but color uniformity is improved due to reduced higher frequency light that has passed through the capillary wall.

Figure 11:
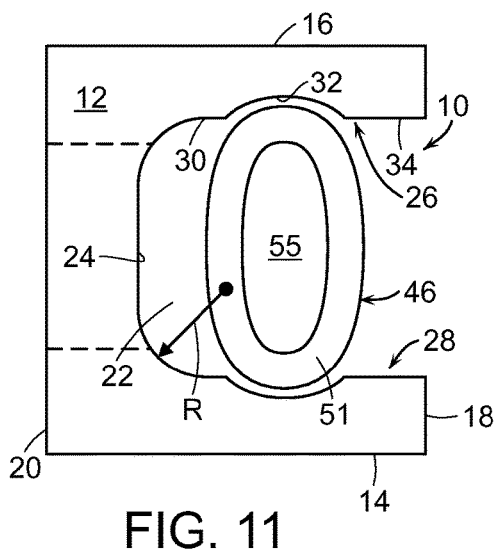
FIG. 11 is an elevation view of an example of another embodiment of the light mixing chamber of the present invention.

In certain embodiments, as illustrated in FIG. 11, the intersections between base portion 24 and first portion 34 of first and second walls 26, 28 are curved in order to redirect light rays in the forward direction through light chamber 10, in order to increase efficiency. In certain embodiments, the intersections may have a radius of curvature between about 0.2 mm and about 2.0 mm.

Figure 12:
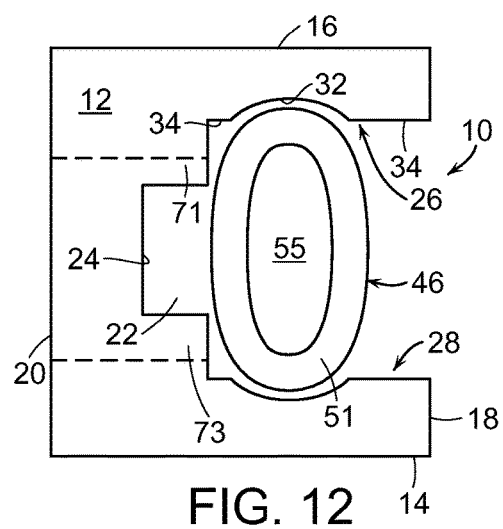
FIG. 12 is an elevation view of example of another embodiment of the light mixing chamber of the present invention.

In certain embodiments, as illustrated in FIG. 12, a first shoulder 71 may be positioned at the intersection between base portion 24 and first portion 34 of first wall 26, and a second shoulder 73 may be positioned at the intersection between base portion 24 and first portion 34 of second wall 28. Shoulders 71, 73 help to redirect higher frequency light into matrix 55 of capillary 46 that would otherwise pass through wall 51. In the illustrated embodiment, first shoulder 71 is formed with a horizontal wall extending outwardly from base portion 24 and a vertical wall extending downwardly from first wall 26, while second shoulder 73 is formed with a horizontal wall extending outwardly from base portion 24 and a vertical wall extending upwardly from second wall 28. Other suitable cross-sectional shapes for first and second shoulders, such as tapered or curved, will become readily apparent to those skilled in the art, given the benefit of this disclosure. Either or both of shoulders 71, 73 may be present.

Figure 13:
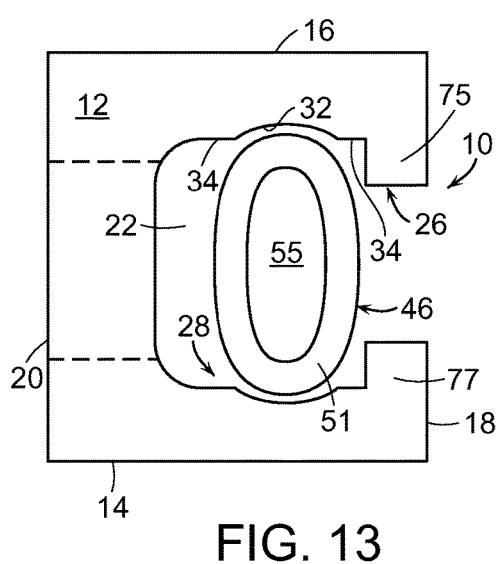
FIG. 13 is an elevation view of yet example of another embodiment of the light mixing chamber of the present invention.

In certain embodiments, as illustrated in FIG. 13, a first flange 75 may extend downwardly from an end of second portion 34 of first wall 26. Similarly, a second flange 77 may extend upwardly from an end of second portion 24 of second wall 28. Flanges 75, 77 are ribs or projections extending inwardly into channel 22 and serve to redirect higher frequency light into matrix 55 of capillary 46 that has passed through the capillary wall and would otherwise inject into light guide plate 42 at undesirable position and angle. In the illustrated embodiment, first and second flanges 75, 77 are rectangular in cross-section. Other suitable cross-sectional shapes for first and second flanges, such as tapered or curved, will become readily apparent to those skilled in the art, given the benefit of this disclosure. It is to be appreciated that either or both of flanges 75, 77 may be present.

Flanges 75, 77 extend inwardly into channel 22 so as to cover part of an emitting face of capillary 46. The size of flanges 75, 77 can be varied such that they act as a lever that can be used to balance efficiency and color uniformity. As the size of flanges 75, 77 increases, the efficiency decreases and the color uniformity increases. Naturally, as the size of flanges 75, 77 decreases, the efficiency increases and the color uniformity decreases.

Figure 14:
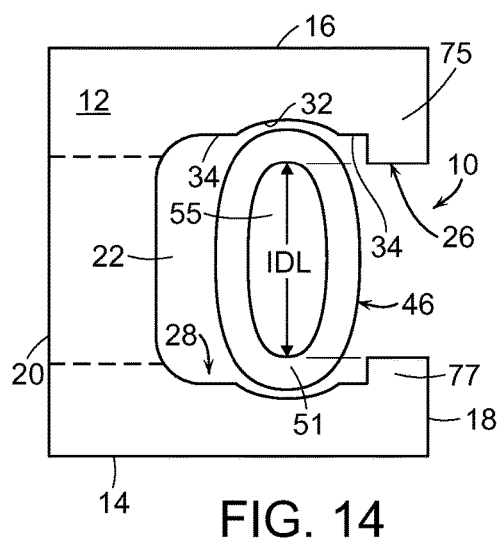
FIG. 14 is an elevation view of a further example of another embodiment of the light mixing chamber of the present invention.

In a preferred embodiment, as illustrated in FIG. 14, flanges 75, 77 extend inwardly into channel 22 to an extent that a portion of the emitting face of capillary 46 corresponding to IDL is fully exposed, and the wall portions above and/or below the portion of the emitting face of capillary 46 corresponding to IDL are fully obscured.

Figure 15A:
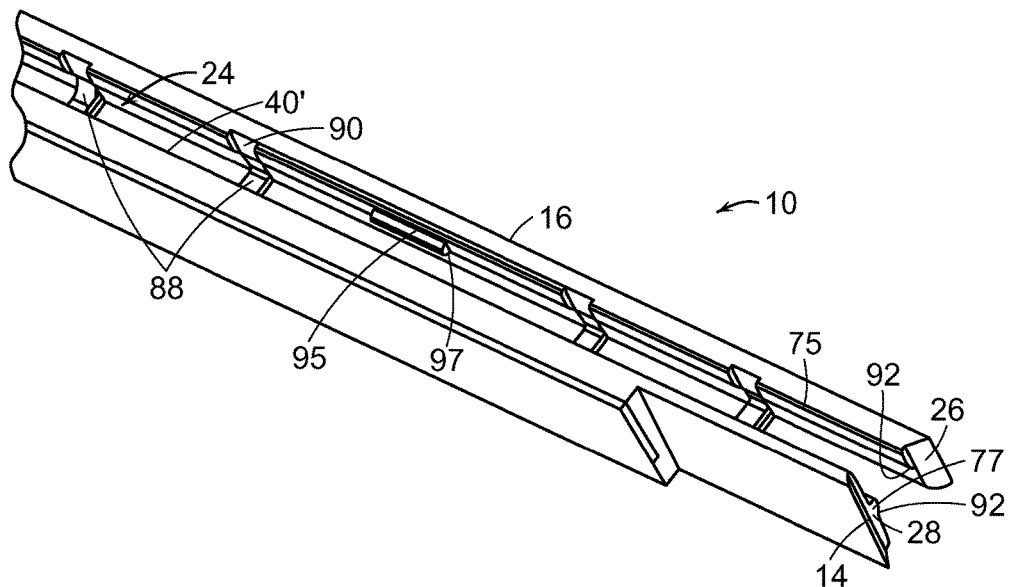
FIGS. 15A and 15B show different perspective views of an example of another embodiment of the light mixing chamber of the present invention.
Figure 15B:
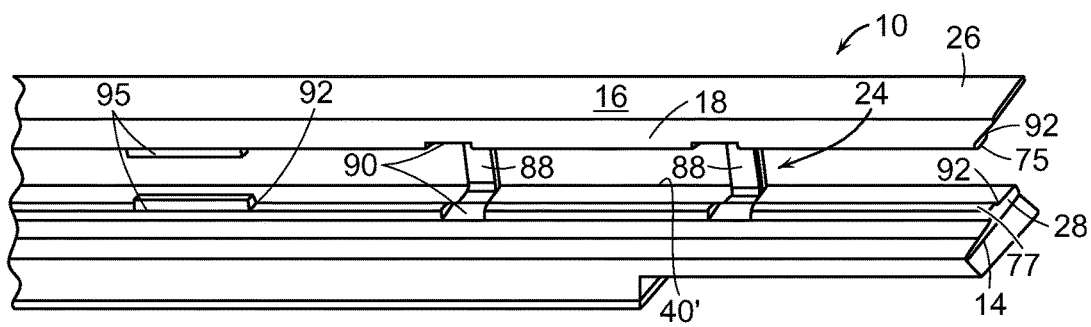

In certain embodiments, as illustrated in FIGS. 15A and 15B, the base portion 24 of light mixing chamber 10 is defined by a plurality of spaced ribs 88. Ribs 88 extend between and connect first wall 26 and second wall 28, thereby defining apertures 40' therebetween. Ribs 88 and apertures 40' are sized such that one or more LEDs may be accommodated at each aperture 40'. It is also to be appreciated that an LED is not necessarily positioned at every aperture 40'.

In certain embodiments, flanges 75, 77, which extend inwardly into channel 22 from first wall 26 and second wall 28, respectively, to an extent that a portion of the emitting face of a capillary 46 (when it is positioned in the light mixing chamber) is exposed, and the flange portions above and/or below the exposed portion of the emitting face of the capillary include a plurality of spaced notches 90, where the notches are aligned with the spaced ribs 88. As illustrated, the internal surface 92 (the surface facing capillary 46 when it is in place within light mixing chamber 10) of each of flanges 75, 77 may be radiused. Thus, in certain embodiments, with a capillary 46 having a cross-section perpendicular to its longitudinal axis having a pair of opposed radius ends with straight parallel sidewalls, the radiused internal surfaces 92 of flanges 75, 77 that face capillary 46 are selected to have a radius that matches that of the portion of capillary 46 that is to be positioned in the light mixing chamber.

In certain embodiments, the light mixing chamber can further include a plurality of optic tabs 95 positioned along the length of light mixing chamber 10. An optic tab 95 extends from at least one of the first flange 75 and second flange 77 of light mixing chamber 10. If optic tabs extend from both the first and second flanges 75, 77, they are preferably aligned to be opposite each other. The number of optic tabs 95 provided in light mixing chamber 10 is selected based on the particular design and length of the light mixing chamber and size of the light guide plate. The optic tabs 95 are positioned between the side of the optic facing the edge of the light guide plate and the edge of the light guide plate. Preferably, when a capillary 46 with a cross-section perpendicular to its longitudinal axis having a pair of opposed radius ends with straight parallel sidewalls, the internal surfaces 97 of the optic tabs 95 that face capillary 46 are selected be radiused with a radius that matches that of the portion of capillary 46 to be positioned in light mixing chamber 10. Optic tab(s) 95 can assist with maintaining the position of the capillary 46 (e.g., by preventing rotation). Optic tab(s) 95 can further assist in maintaining the predetermined alignment of capillary 46 and light guide plate 42.

Figure 16A:
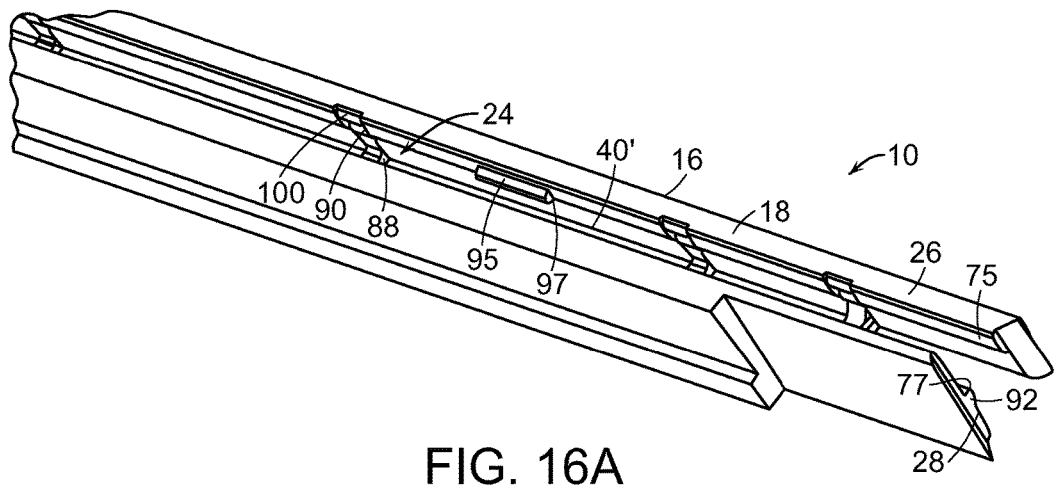
FIGS. 16A-16C show different perspective views of an example of another embodiment of the light mixing chamber of the present invention.
Figure 16B:
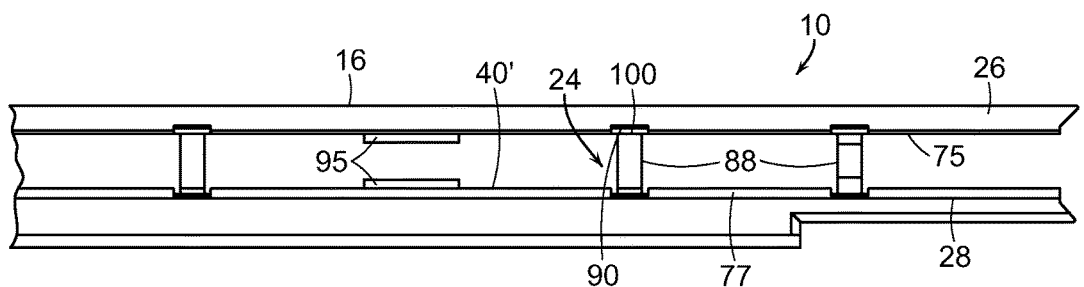
Figure 16C:
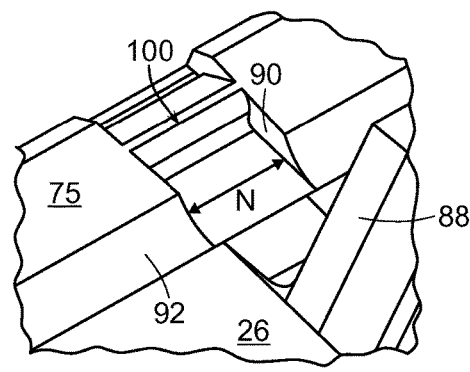

In certain preferred embodiments, as illustrated in FIGS. 16A-C, a notch insert 100 may be positioned within notches 90 in flange 75. FIG. 16C shows a portion of light mixing chamber 10 in an inverted position such that flange 75 is projecting upwardly. Notch inserts 100 extend from the inner surface of notch 90 to a point where they are flush with the surface of flange 75. Notch inserts 100 are positioned between the front face of flange 75 and the surface of optic capillary 46 facing the light guide plate 42. Notch inserts can take on any desired shape that extends between the inner surface of notch 90 to a point where it is flush with the surface of flange 75. It is to be appreciated that notch inserts 100 may be of unitary, that is, one-piece, construction with light mixing chamber 10. In other embodiments notch inserts 100 may be separate elements secured within notches 90 with any desired securing means such as adhesive, for example.

Notch inserts 100 function to block light as it's emitted from the LED and also to block light as it passes through the non-matrix portion of capillary 46 (ODL minus IDL). In certain embodiments, as seen in FIG. 16C, notch inserts 100 span the entire width N of notch 90. In other embodiments, notch inserts 100 span less than the full width N of notch 90. Notch inserts 100 may, in certain embodiments, span between approximately 50% and approximately 100% of width N of notch 90.

Notch inserts 100 may be formed of a material that is the same as the material from which the light mixing chamber 10 is constructed. Other materials with similar properties may also be determined to be useful to form notch inserts 100. Optionally, a notch insert 100 can also be included in each notch in flange 77.

As discussed above, various elements of the light mixing chamber assembly disclosed herein can be varied or adjusted so as to be used as a lever to balance efficiency and color uniformity, which have an inverse relationship to one another. A number of illustrative examples are provided here, illustrating how these levers act to balance efficiency and color uniformity. It is to be appreciated that for these examples, the concentration of color converting material in the matrix is adjusted to achieve a uniform front of display white point.

For the purpose of evaluating the efficacy of the various design levers described herein, appropriate metrics for efficiency and color uniformity may be identified based on the spectral power distribution of light injected from the light generating portion of the backlight into the light guide plate. In the case of efficiency, a metric may be based on the integrated photometric (i.e., eye visual response corrected) flux that injects into the light guide plate. In the case of color uniformity, a metric may be based on the variation in the color of light over the range of angles that inject into the light guide plate, where a lower variation in color over angle corresponds to an improved color uniformity in the BLU. The color of visible light may be quantified as a two element coordinate in an appropriate color space, such as the CIE 1931 xy chromaticity space, or the CIE 1976 u'v' chromaticity space. The latter features a more uniform difference in coordinates u' and v' between visually perceptible colors and is preferably used when describing differences between colors. The difference between two colors calculated using the u'v' space is termed du'v'. The du'v' color difference between two colors in the CIE 1976 u'v' chromaticity space is determined by calculating a first difference between the u' coordinates of the two colors, calculating a second difference between the v' coordinates of the two colors, and then calculating the square root of the sum of the squares of the first and second differences. A metric for color uniformity may thus be based on the weighted average of color difference du'v', relative to the average color u'v', over the full angular range of light that injects into the light guide plate, weighted by the injected light flux.

These examples show, in both graph and table form, the result of varying or adjusting the different levers that are used to balance efficiency and color uniformity as compared to an identified reference case. Thus, for each reference case, the data for the increases and decreases in efficiency and color uniformity are shown relative to the reference case. Relative efficiency of injection into the light guide plate is defined as the percent difference between the efficiency of each case and the efficiency of the reference case. With respect to efficiency of injection into the light guide plate, a positive number indicates an efficiency that is better than that of the reference case, which is considered to have a value of 0 for efficiency, and a negative number indicates an efficiency that is worse than that of the reference case.

Relative color uniformity of injection into the light guide plate is defined as the difference between the weighted average du'v' color variation of each case and the weighted average du'v' color variation of the reference case. With respect to color uniformity, a positive number indicates a color uniformity that is better than that of the reference case, which is considered to have a value of 0 for color uniformity, and a negative number indicates an efficiency that is worse than that of the reference case.

Figure 17:
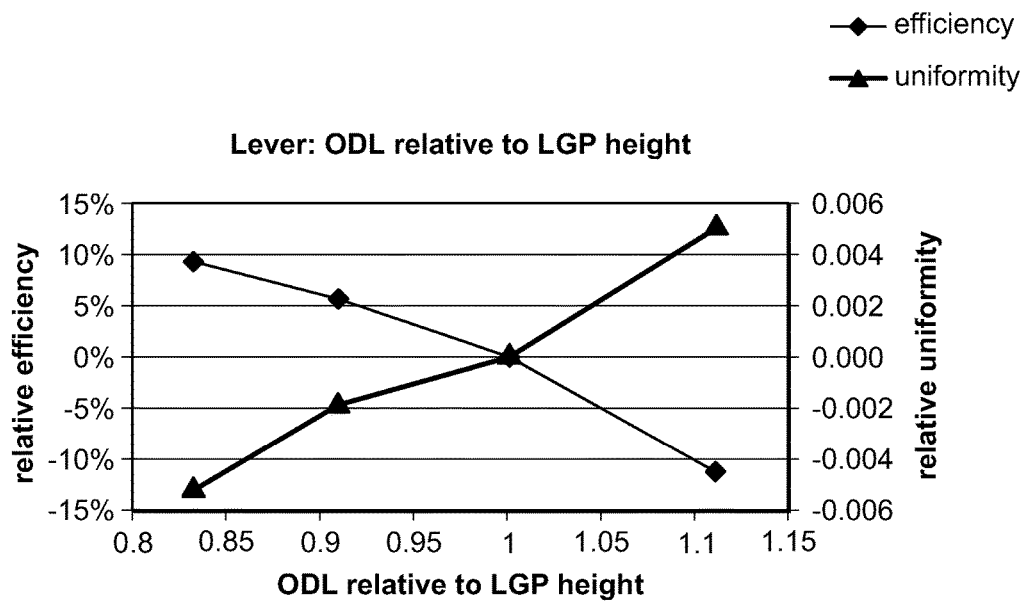
FIGS. 17-22 graphically show how various parameters can be used as levers to balance efficiency and color uniformity.

In one example, as shown below in Table 1, and as graphically represented in FIG. 17, the size of ODL as compared to the height of light guide plate 42 can be used as a lever to balance efficiency and color uniformity. In the reference case for this example, ODL of capillary 46 is equal to the height of light guide plate 42. In this example, the scatterer concentration within matrix 55 of capillary 46 is approximately 0.1 wt % of the total weight of the matrix.

TABLE 1

| ODL relative to LGP Height | Relative Efficiency | Relative Uniformity | Relative QD Loading |
|---|---|---|---|
| 0.83 | 9.0% | −0.005 | 11% |
| 0.91 | 5.5% | −0.002 | 2% |
| 1.00 | 0.0% | 0.000 | 0% |
| 1.11 | −11.5% | 0.005 | −4% |

Figure 18:
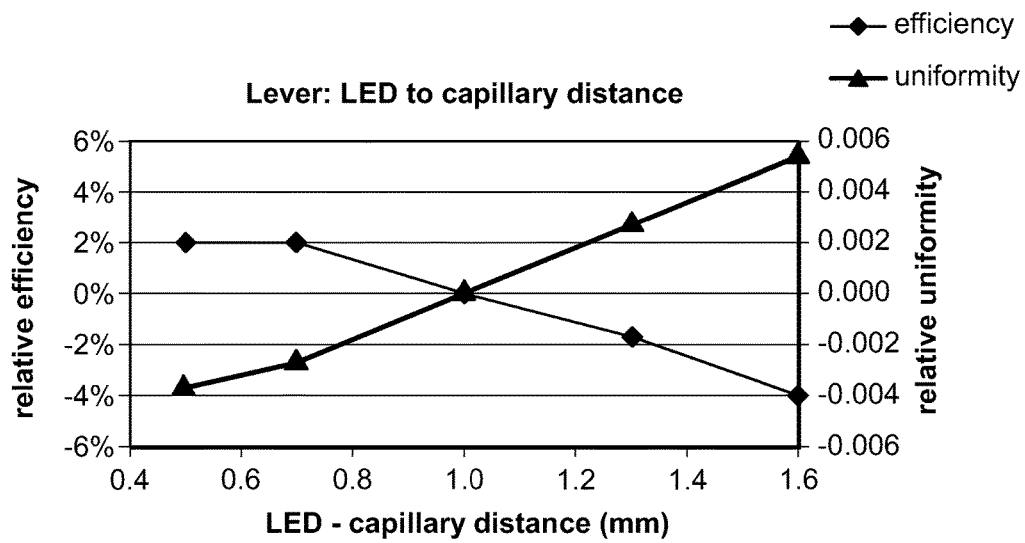

In another example, as shown below in Table 2, and as graphically represented in FIG. 18, the distance between LED 44 and capillary 46 is used as a lever to balance efficiency and color uniformity. In the reference case for this example, the distance between LED 44 and capillary 46 is 1.0 mm. In this example, the scatterer concentration within matrix 55 of capillary 46 is approximately 0.1 wt % of the total weight of the matrix.

TABLE 2

| LED to Capillary Gap (mm) | Relative Efficiency | Relative Uniformity | Relative QD Loading |
|---|---|---|---|
| 0.5 | 2.1% | −0.004 | −9% |
| 0.7 | 1.9% | −0.003 | −4% |
| 1 | 0.0% | 0.000 | 0% |
| 1.3 | −1.7% | 0.003 | 2% |
| 1.6 | −4.0% | 0.005 | 3% |

Figure 19:
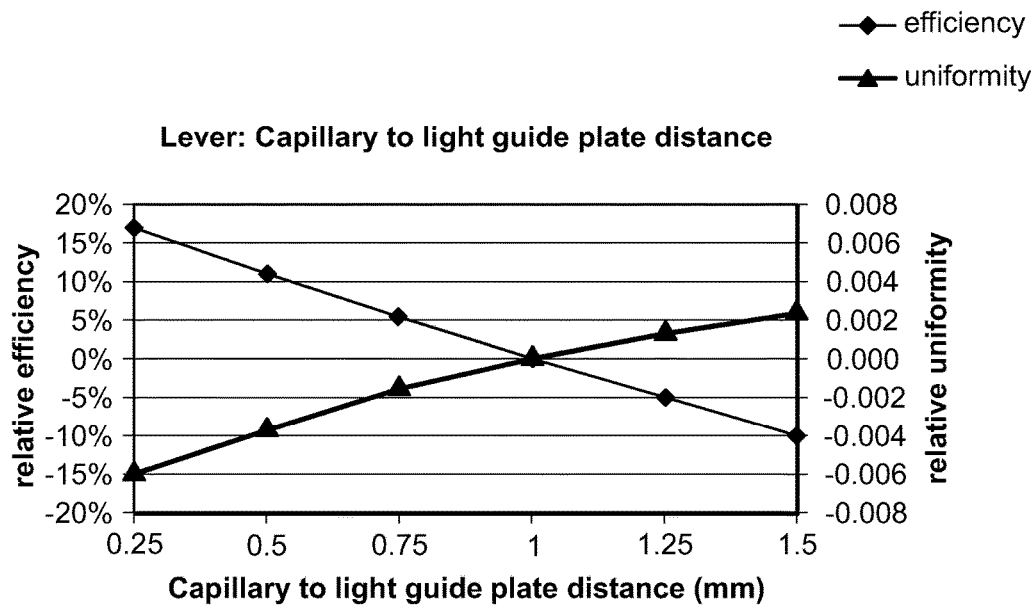

In a further example, as shown below in Table 3, and as graphically represented in FIG. 19, the distance between capillary 46 and light guide plate 42 is used as a lever to balance efficiency and color uniformity. In the reference case for this example, the distance between capillary 46 and light guide plate 42 is 1.0 mm. In this example, the scatterer concentration within matrix 55 of capillary 46 is approximately 0.1 wt % of the total weight of the matrix.

TABLE 3

| Capillary to LGP Distance (mm) | Relative Efficiency | Relative Uniformity | Relative QD Loading |
|---|---|---|---|
| 0.25 | 16.5% | −0.006 | −2% |
| 0.5 | 10.9% | −0.004 | −3% |
| 0.75 | 5.2% | −0.002 | −1% |
| 1 | 0.0% | 0.000 | 0% |
| 1.25 | −5.0% | 0.001 | 1% |
| 1.5 | −10.2% | 0.002 | 2% |

Figure 20:
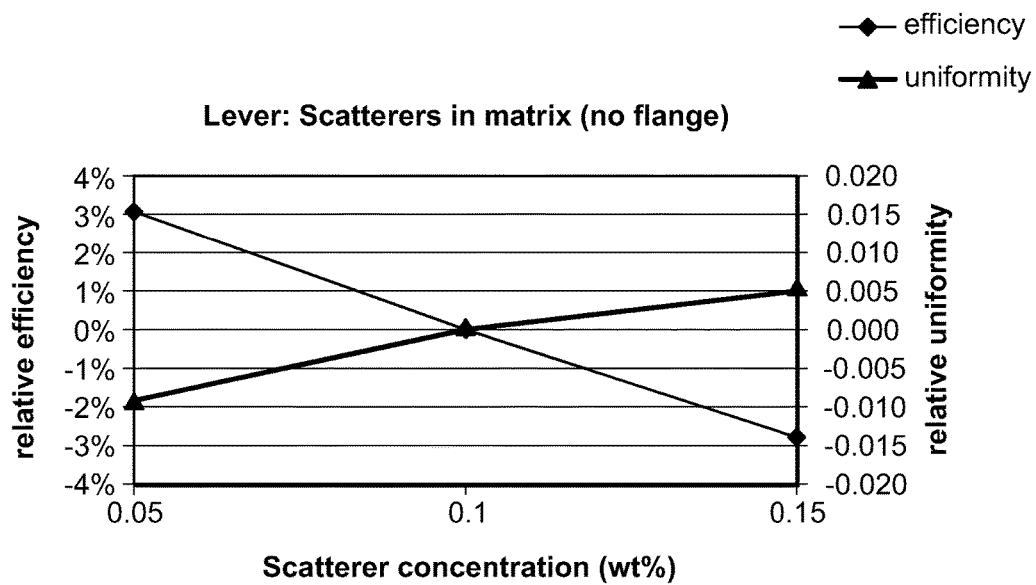

In yet another example, as shown below in Table 4, and as graphically represented in FIG. 20, the concentrations of scatterers in matrix 55 in the absence of any flange can be used as a lever to balance efficiency and color uniformity. In the reference case for this example, the scatter loading is 0.1 wt % of the total weight of the matrix.

TABLE 4

| Scatterer Concentration | Relative Efficiency | Relative Uniformity | Relative QD Loading |
|---|---|---|---|
| 0.05% | 3.1% | −0.010 | 36% |
| 0.1% | 0.0% | −0.000 | 0% |
| 0.15 | −2.8% | 0.005 | −17% |

Figure 21:
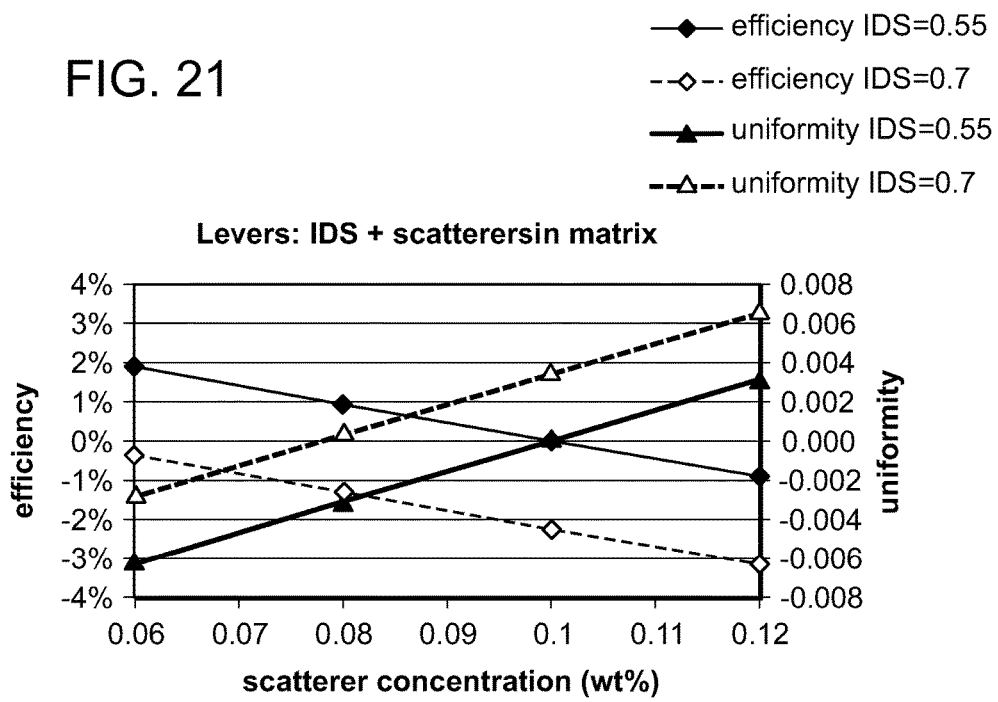

In yet a further example, as shown below in Table 5, and as graphically represented in FIG. 21, scatterer concentration and the value of IDS can be combined to act as a lever to balance efficiency and color uniformity. In the reference case for this example, IDS=0.55 mm and the scatterer concentration is 0.10 wt % of the total weight of the matrix.

TABLE 5

| IDS (mm) | Scatterer Concentration (wt. %) | Relative Efficiency | Relative Uniformity | Relative QD Loading |
|---|---|---|---|---|
| 0.55 | 0.06% | 1.8% | 0.006 | 18% |
| 0.55 | 0.08% | 0.9% | 0.003 | 9% |
| 0.55 | 0.1% | 0.0% | 0.000 | 0% |
| 0.55 | 0.12% | −0.9% | −0.003 | −9% |
| 0.7 | 0.06% | −0.4% | 0.003 | −16% |
| 0.7 | 0.08% | −1.3% | 0.000 | −25% |

TABLE 5-continued

| IDS (mm) | Scatterer Concentration (wt. %) | Relative Efficiency | Relative Uniformity | Relative QD Loading |
|---|---|---|---|---|
| 0.7 | 0.1% | −2.2% | −0.003 | −34% |
| 0.7 | 0.12% | −3.2% | −0.006 | −42% |

Figure 22:
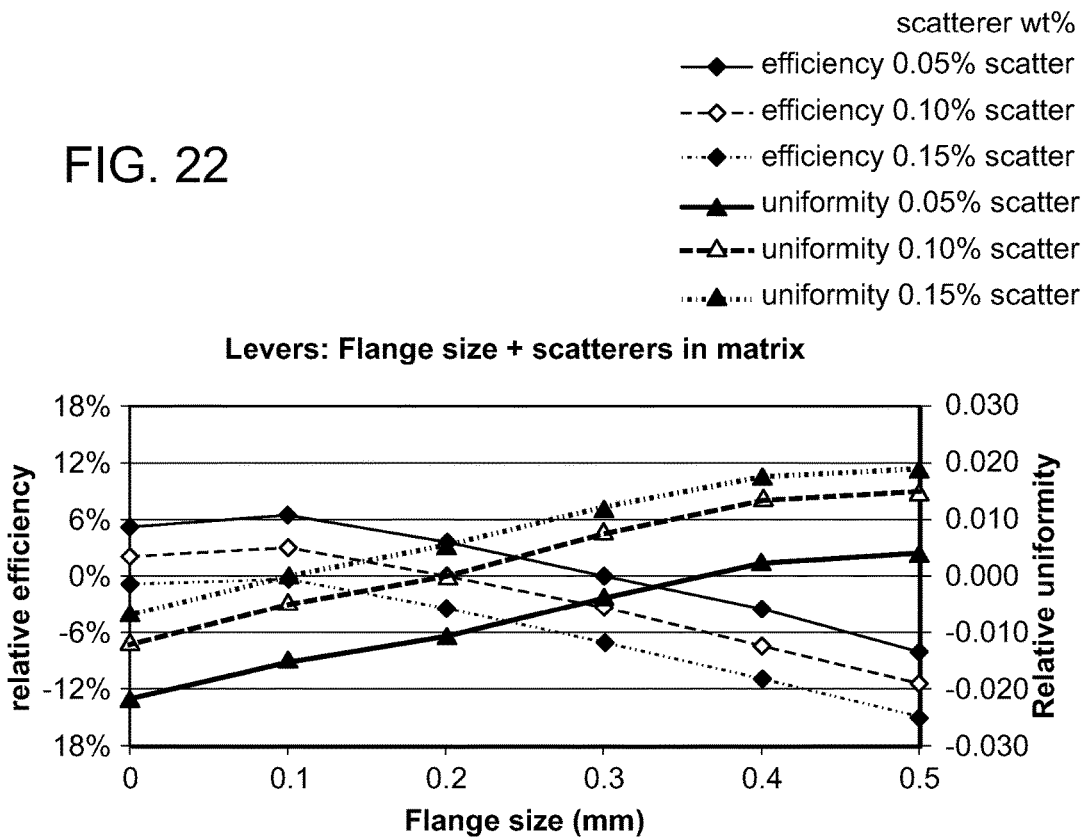

In another further example, as shown below in Tables 6, 7, and 8, and as graphically represented in FIG. 22, the size or height of flange 75, 77, as illustrated, by way of non-limiting example, above in FIGS. 13-14, and scatterer concentration can be combined to act as a lever to balance efficiency and color uniformity. In the reference case for this example, the height of the flange=0.2 mm and the scatterer loading is 0.10 wt % of the total weight of the matrix.

TABLE 6

SCATTERER CONCENTRATION = 0.05 wt %

| Flange Size (mm) | Relative Efficiency | Relative Uniformity | Relative QD Loading |
|---|---|---|---|
| 0 | 5.1% | −0.021 | 71% |
| 0.1 | 6.3% | −0.015 | 51% |
| 0.2 | 3.5% | −0.011 | 38% |
| 0.3 | 0.1% | −0.004 | 22% |
| 0.4 | −3.6% | 0.002 | 7% |
| 0.5 | −7.9% | 0.004 | −5% |

TABLE 7

SCATTERER CONCENTRATION = 0.10 wt %

| Flange Size (mm) | Relative Efficiency | Relative Uniformity | Relative QD Loading |
|---|---|---|---|
| 0 | 2.0% | −0.012 | 26% |
| 0.1 | 2.9% | −0.005 | 10% |
| 0.2 | 0.0% | 0.000 | 0% |
| 0.3 | −3.4% | 0.008 | −13% |
| 0.4 | −7.5% | 0.014 | −23% |
| 0.5 | −11.5% | 0.015 | −32% |

TABLE 8

SCATTERER CONCENTRATION = 0.15 wt %

| Flange Size (mm) | Relative Efficiency | Relative Uniformity | Relative QD Loading |
|---|---|---|---|
| 0 | −0.9% | −0.007 | 5% |
| 0.1 | −0.6% | 0.000 | −8% |
| 0.2 | −3.4% | 0.006 | −17% |
| 0.3 | −7.1% | 0.012 | −28% |
| 0.4 | −11.0% | 0.018 | −36% |
| 0.5 | −15.0% | 0.019 | −43% |

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

Thus, while there have been shown, described, and pointed out fundamental novel features of various embodiments, it will be understood that various omissions, substitutions, and changes in the form and details of the light mixing chamber illustrated, and in their operation, may be made by those skilled in the art without departing from the spirit and scope of the invention. For example, it is expressly intended that all combinations of those elements and/or steps which perform substantially the same function, in substantially the same way, to achieve the same results are within the scope of the invention. Substitutions of elements from one described embodiment to another are also fully intended and contemplated. It is the intention, therefore, to be limited only as indicated by the scope of the claims appended hereto.

What is claimed is:

1. An assembly including:
   a housing having a channel exposed to an exterior of the housing, a chamber, and an aperture connecting the chamber to the channel;
   an LED positioned within the chamber;
   a capillary positioned in the channel and having an interior cavity containing a color converting material and scattering elements, wherein the capillary has a light entry surface which faces the LED and a light exit surface opposed to the light entry surface;
   a light guide plate positioned adjacent the housing and which faces the light exit surface of the capillary; and
   a first coating on the light entry surface of the capillary and a second coating on the light exit surface of the capillary, wherein the first coating has higher transmittance for high frequency visible light than that for low frequency visible light and entire area of the second coating has higher transmittance for the low frequency visible light than that for the high frequency visible light.

2. The assembly of claim 1, wherein a light from the LED can enter the capillary through the light entry surface and exit the capillary through the light exit surface.

3. The assembly of claim 1, wherein the first coating is dichroic.

4. The assembly of claim 1, wherein the first coating comprises a microlens coating.

5. The assembly of claim 1, wherein the second coating is dichroic.

6. The assembly of claim 1, wherein the second coating comprises a microlens coating.

7. The assembly of claim 1, wherein the channel includes a base portion, a first wall, and an opposed second wall, and at least one of an intersection between the base portion and the first wall and an intersection between the base portion and the second wall is curved.

8. The assembly of claim 1, wherein the channel includes a base portion, a first wall, and an opposed second wall, and further comprising at least one shoulder positioned at one of an intersection between the base portion and the first wall and an intersection between the base portion and the second wall.

9. The assembly of claim 1, further comprising a diffusive high reflectivity paint to upper and lower portions of the exterior of the capillary.

10. The assembly of claim 1, wherein the color converting material comprises quantum dots.

11. The assembly of claim 4, wherein the microlens coating comprises a layer of binding fluid containing optically clear beads.

12. A light mixing chamber comprising:
a housing having a channel formed therein, the channel exposed to an exterior of the housing;
a chamber formed in the housing; and
an aperture formed in the housing and connecting the chamber to the channel, wherein the channel includes a base portion, a first wall, and an opposed second wall, and further comprising at least one shoulder positioned at one of an intersection between the base portion and the first wall and an intersection between the base portion and the second wall.

13. A method of balancing efficiency and color uniformity of light produced in a backlight including the steps of:
providing a light mixing chamber including a housing having a channel exposed to an exterior of the housing, a chamber, and an aperture connecting the chamber to the channel, an LED positioned within the chamber, a capillary containing a color converting material positioned in the channel, a light guide plate positioned adjacent the housing and adjacent the capillary, and at least one flange extending inwardly into the channel at an end of one of the first wall and the second wall; and
adjusting a size of the at least one flange to produce a desired balance between efficiency and color uniformity of light produced by the light mixing chamber, wherein increasing the size decreases efficiency and improves color uniformity, and decreasing the size increases efficiency and worsens color uniformity.

14. A light mixing chamber comprising:
a housing having a channel formed therein, the channel exposed to an exterior of the housing;
wherein the channel includes a base portion, a first wall, and an opposed second wall;
at least one flange extending inwardly into the channel at an end of one of the first wall and the second wall;
wherein the base portion comprises a plurality of ribs extending between the first wall and the second wall and defining apertures there between; and
a plurality of notches formed in the at least one flange, each notch being aligned with one of the ribs.

15. The light mixing chamber of claim 14, further comprising a plurality of notch inserts, each notch insert being positioned in a notch and extending from an inner surface of the notch to a point where it is flush with the surface of the at least one flange.

16. The light mixing chamber of claim 15, wherein each notch insert spans less than an entire width of the notch within which it is positioned.

17. The light mixing chamber of claim 16, wherein each notch insert spans between approximately 50% and approximately 100% of a width of the notch within which it is positioned.

* * * * *